United States Patent [19]

Mason et al.

[11] Patent Number: 6,053,692
[45] Date of Patent: *Apr. 25, 2000

[54] DEVICE FOR SECURING A REMOVABLE CONTAINER TO A HAULING VEHICLE

[76] Inventors: Thomas M. Mason, 378 Blacktown Rd.; Richard K. Rohrer, 19 Bell Rd., both of Grove City, Pa. 16127

[ * ] Notice: This patent issued on a continued prosecution application filed under 37 CFR 1.53(d), and is subject to the twenty year patent term provisions of 35 U.S.C. 154(a)(2).

[21] Appl. No.: 08/503,156

[22] Filed: Jul. 17, 1995

[51] Int. Cl.[7] ..................................................... B60P 7/08
[52] U.S. Cl. ............................. 414/498; 410/80; 410/69; 410/77; 414/484
[58] Field of Search ..................................... 414/471, 482, 414/483, 484, 494, 498, 500; 410/66, 68, 69, 70, 72–75, 77, 80, 81, 90; 292/106, 109; 298/22 P; 280/DIG. 8; 296/35.1, 35.3; 248/500, 503

[56] References Cited

U.S. PATENT DOCUMENTS

| | | | |
|---|---|---|---|
| 2,793,061 | 5/1957 | Dall | 292/109 X |
| 3,204,796 | 9/1965 | Hand | 414/498 |
| 3,399,795 | 9/1968 | Clucker et al. | 414/500 |
| 3,604,363 | 9/1971 | Smith | 410/70 |
| 4,165,007 | 8/1979 | Brown . | |
| 4,453,878 | 6/1984 | Paukku | 414/498 X |
| 5,106,247 | 4/1992 | Hove et al. | 410/90 X |
| 5,362,184 | 11/1994 | Hull et al. . | |

OTHER PUBLICATIONS

Brochure Entitled: *Galbreath Roll–Off Hoist Series* from Galbreath Incorporated, Winamae, Indiana.

*Primary Examiner*—Stephen T. Gordon
*Attorney, Agent, or Firm*—George C. Atwell

[57] ABSTRACT

A device is provided for use on a vehicle chassis for securing a removable container during its transport. The chassis is the type having a tilting frame enabling a loaded container to be slidably cable-drawn from ground level onto the vehicle. The securing device includes a first sub-section mounted to the tilting frame side with a pivotal hook-like latching bar for securing the container to the tilting frame. The securing device further includes a second sub-section mounted in vertical alignment with the first sub-section, which acts to pivot the latching bar between its non-engaged position and its engaged position as a function of the movement of the tilting frame relative to the chassis.

18 Claims, 2 Drawing Sheets

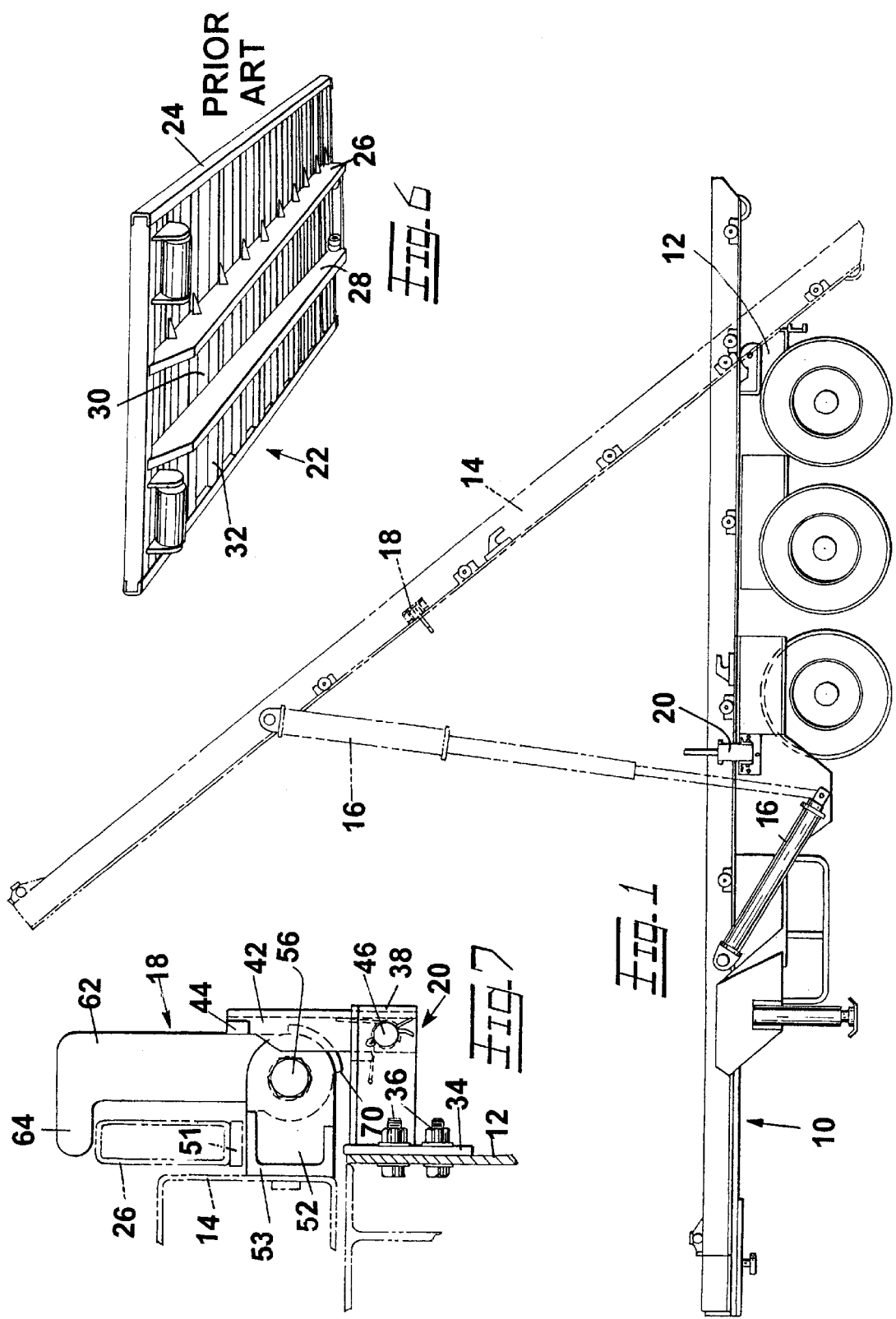

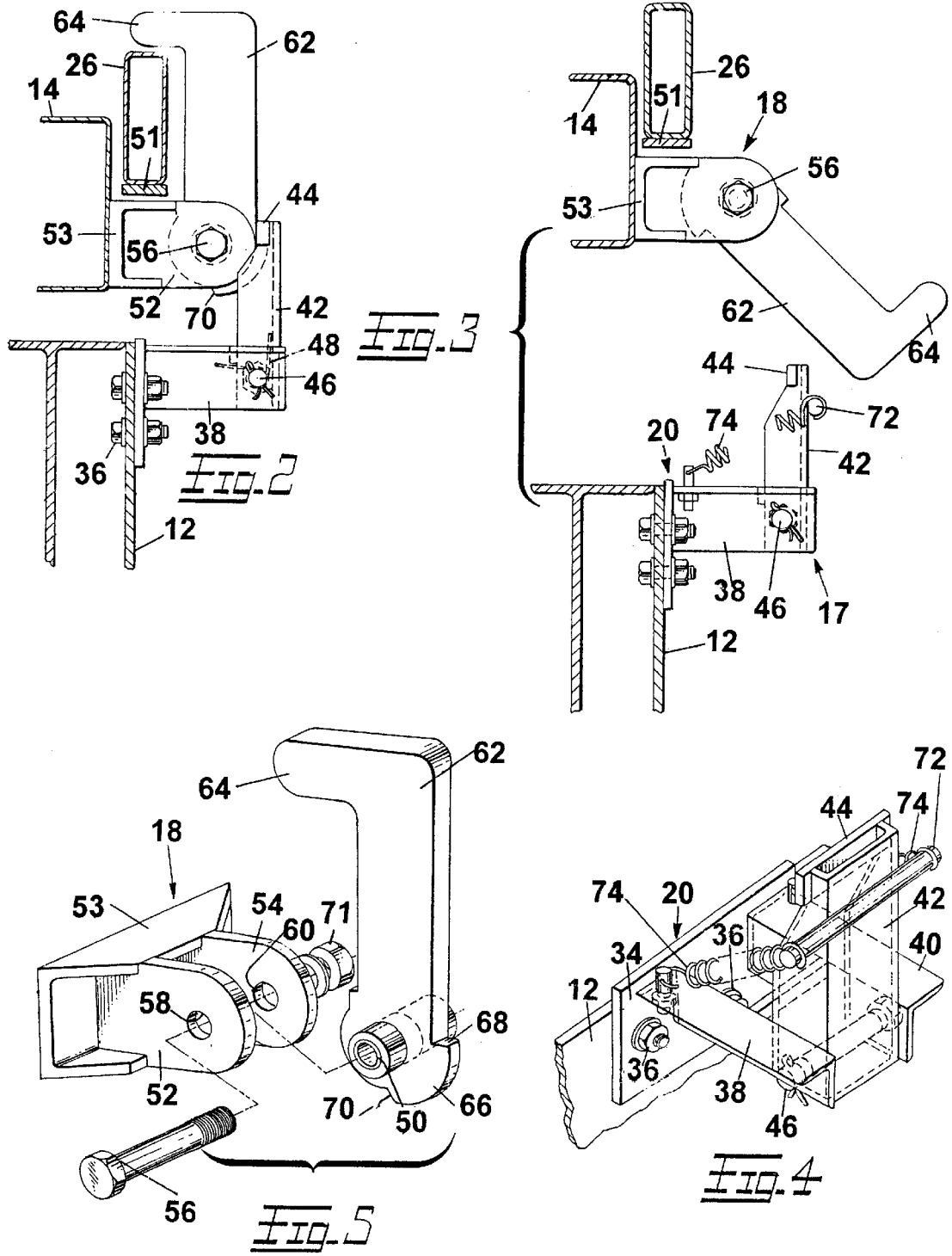

DEVICE FOR SECURING A REMOVABLE CONTAINER TO A HAULING VEHICLE

BACKGROUND OF THE INVENTION

This invention relates generally to a container-hauling vehicle, particularly a truck, wherein the container is removably mounted on the truck bed for transport, and more particularly pertains to a device for automatically securing a container for transport on a vehicle.

It is common practice to transport large box-like containers on specially designed trucks, with the container being adapted to be removably secured on the truck bed during transport but otherwise serving as a stationary on-site receptacle. Such a container is extremely large and generally rectangular, having a width comparable to the width of the truck bed on which it is to be transported and an even greater length generally consistent with the length of the transporting truck. The truck typically has a container support platform or tilting frame pivotally secured on the rear portion of the truck chassis whereby the tilting frame can be hydraulically pivoted between a transport position and a tilted position to facilitate loading of the receptacle with a winch and cable which pulls the receptacle onto the tilting frame.

While the weight of a loaded container is usually sufficient to maintain the container in place for transport on the truck, it is desirable to secure the container to the truck chassis and thereby prevent any undesired shifting or sliding of the container during transport. A common means of securing a container on such a vehicle to prevent its undesired movement involves the utilization of a nylon strap and ratchet mechanism. Such a mechanism is located along the chassis and has a hook at the end of the nylon strap for engaging the container whereby tension on the strap tends to bind the container to the chassis. The use of the mechanism is optional to the operator who must manually engage and disengage it. A large container may utilize four or more such mechanisms, disposed in equal number in spaced-apart relation along each side of the truck chassis, requiring the truck operator to manipulate and secure each mechanism prior to receptacle transport, and then to release each mechanism prior to receptacle unloading.

SUMMARY OF THE INVENTION

A general objective of the present invention is to provide, on a tilting frame receptacle-transporting truck or vehicle, a positive means of securing or locking the receptacle in position during transport that is not dependent upon the operator for its actuation.

More specifically, it is an objective of the present invention to provide an automatically-actuated latching means for securing a large container to a tilting frame-type of vehicle wherein the operation of the means of securing the receptacle to the transporting vehicle occurs as an automatic function of the receptacle being placed in its transport position on the vehicle.

The present invention particularly addresses utilization of a truck of the type having a chassis equipped to load, transport, and unload a large refuse container by utilization of a tilting frame extending longitudinally on the chassis and mounted to pivot from a transport position to a tilted loading position on an axis transverse to and adjacent the rear end of the chassis. The container is provided with underside spaced-apart parallel rail members for enabling loading and unloading of the container relative to the tilting frame. A means for securing the container, for transport, to the tilting frame, comprises a device including a latch assembly pivotally mounted on and outboard from the tilting frame and adapted to releasably engage the container as a function of the tilting action of the frame. Mounted on the chassis and subjacent the latch assembly is a latch actuation means which operatively interacts with the latch assembly to complete a latching action between the tilting frame and the container as a function of the tilting frame being pivoted to its horizontal transport position on the truck chassis.

The benefits and advantages of the invention will become apparent from a full consideration of the ensuing detailed description when read with reference to the accompanying drawings which illustrate the presently preferred embodiment of the invention.

BRIEF DESCRIPTION OF THE DRAWINGS

FIG. 1 is a side elevational view of a truck chassis utilizing the device of the present invention;

FIG. 2 is a side elevational view illustrating the elements and operation of the device of the present invention;

FIG. 3 is a side elevational view illustrating discrete upper and lower sections of the device of the present invention;

FIG. 4 is an isometric view of the lower section of the device of the present invention;

FIG. 5 is an isometric exploded view of the upper section of the device of the present invention;

FIG. 6 is an isometric view of the underside of a typical container to which the device of the present invention would be applicable; and FIG. 7 is a side elevational view showing the device of the present invention in its latched operative position.

DETAILED DESCRIPTION OF THE PREFERRED EMBODIMENT

FIG. 1 depicts a side view of a truck chassis 10 which would normally appear as a rearward extension from a closed cab (not shown). The truck is the type having a chassis equipped to load, transport, and unload a large container by utilization of a tilting frame 14 which extends longitudinally on the chassis 12 and is mounted to pivot from a transport position to a tilted loading position (as represented by phantom line illustration) about an axis transverse to and adjacent the rear end of the chassis 12. Laterally spaced-apart hydraulic cylinders 16 are provided on the chassis 12 and adapted to be actuated by the truck operator to cause the tilting frame 14 to pivot to its tilted position to facilitate slidable loading of a container thereon. Only one cylinder 16 is shown in FIG. 1. FIG. 1 also illustrates a latching assembly or device 17 (see FIG. 3), including an upper section 18 mounted on the tilting frame 14, and a lower section 20 mounted on the chassis 12.

FIG. 6 illustrates the floor portion 24 of a receptacle 22 having longitudinally-extending spaced-apart rails 26 and 28, each having a subjacent rigid skid strip 51 (FIGS. 2 and 3) secured to its undersurface. The structure of the floor portion 24 of the receptacle 22 includes a plurality of cross members 32 defining, between each pair of such cross members, a space 30 above the skid rails 26 and 28. The receptacle 22 is commercially available, and, accordingly, is known prior art.

FIG. 4 illustrates the lower section or sub-assembly 20 of the latching device 17. FIG. 5 illustrates the upper section or sub-assembly 18 of the device 17. Referring first to FIG. 5, the section 18 of the device 17 comprises a rigid base member 53 which, in its operative disposition, is weldably secured to the outboard side of the tilting frame 14, as shown in FIG. 3. Extending outwardly from the base member 53 are rigid spaced-apart arms 52 and 54 having respective openings 58 and 60 to accommodate extension therethrough of the clevis pin 56. A rigid hook or latching bar 62 having a laterally-projecting finger portion 64 is pivotally mounted between the arms 52 and 54. The latching bar mounting arrangement includes a clevis pin or bolt 56 which projects through openings 58 and 60 and bushing 50 of the base portion of the latching bar 62. The bolt 56 is secured to arms 52 and 54 by means of a nut 71.

FIG. 4, illustrates the lower section 20 of the device 17, which serves as a means of actuating the upper section 18. The section 20 comprises a rigid base 34 which is mounted to the truck chassis 12 by means of fasteners 36. Projecting outwardly from the base member 34 are spaced-apart rigid angle members 38 and 40, both of which are welded at their inner ends to the base member 34. Pivotally carried between the angle members 38 and 40 is a rigid, normally-upstanding, tongue-like member 42 adapted to pivot about a horizontally-disposed shaft 46 between a container-engaging position and a disengaged position. The upwardly-projecting tongue 42 has a cross-plate 44 at its upper end. The tongue 42 can be tilted on the shaft 46, clockwise as viewed in FIG. 3, and is normally biased to its upright position by a helicoidal spring means as shown in FIG. 4, including a pair of extension springs 74 extending, respectively, from opposite ends of a crossbar or rod 72. Alternatively, the spring means may be a torsion spring 48 carried on the shaft of the pin 46 as shown in FIG. 7.

FIG. 3 shows the relative positioning of the upper section 18 and the lower section 20 of the device 17 when the tilting frame is slightly tilted toward the position shown in FIG. 1. The latching bar 62 is in its inoperative or disengaged position, extending generally outward away from the frame 14 on which it is mounted. The latching bar 62 has an elongated intermediate body portion projecting from a base portion having an arcuate cam edge or surface 66 terminating at one end as a ridge 68 and at its other end as a ridge 70 (see FIG. 5).

To facilitate its proper use in operation, the device 17 is mounted with its upper section 18 on and outboard of the side of the tilting frame 14, and the section 20 is mounted on and outboard of the chassis 12, as shown in FIG. 1, whereby sections 18 and 20 will come into relative vertical alignment as the tilting frame 14 is moved to its horizontal position on the chassis 12. Assuming a container is to be loaded and transported on the truck 10, the truck operator, from his forward cab position, energizes the cylinders 16 to pivot the tilting frame 14 upwardly as shown in FIG. 1 whereby a winch (not shown) mounted at the forward end of the tilting frame 14 is used to retract a cable extending longitudinally on the tilting frame to engage and pull the aligned container up the inclined frame body. The container 22 (FIG. 6) is designed whereby its rails 26 and 28 are appropriately spaced to straddle the tilting frame on a line of rollers as shown in FIG. 1. The tilting frame 14 is gradually lowered as the container is slidably moved toward its transport position thereon. Although FIG. 1 illustrates only one device 17, comprising upper and lower sections 18 and 20, it may be preferable to have several such devices mounted in spaced-apart relation along each side of the truck 10. Regardless of the number of devices utilized, it is critical that the device 17 be properly positioned whereby the latching bar 62 will engage with its intermediate body portion against the side of its adjacent container rail, such as rail 26, and be properly spaced along the rail so that the finger portion 64 will extend into one of the spaces 30 between an adjacent pair of the cross-members 32.

When the container 22 has been drawn substantially onto the tilting frame, the container at rail 26 will appear in the disposition shown in FIG. 3 relative to section 18 of the device 17. FIG. 3 also shows that the latching bar 62, in its disengaged position, projects generally laterally outward from the tilting frame 14 and slightly downward so as to be entirely clear of the container during the loading operation. Then, as the tilting frame 14 is pivoted toward its horizontal transport position on the truck chassis, the outer surface or edge of the intermediate body portion of the latching bar 62 impacts against the crossbar 44 of the tongue 42. The latching bar 62 is caused to pivot from the position shown in FIG. 3 to its container-engaging position shown in FIG. 2. Finally, when the tilting frame 14 has been fully returned to its horizontal disposition on the truck chassis 12, the latching bar 62 is disposed as shown in FIG. 7 whereby the finger portion 64 projects over the container at rail 26, and the crossbar 44 of the tongue 42 is contiguous to the outer edge of the intermediate body portion of the latching bar 62 whereby the latching bar 62 is held in its engaged position relative to the container rail.

The device 17 is designed and adapted to automatically disengage from the position shown in FIG. 2 to that which is shown in FIG. 3 as an incident or function of the tilting frame 14 being tilted from its horizontal disposition as shown in FIG. 7 to its tilted unloading disposition as represented in FIG. 3. When the upward tilting action of the frame 14 is initiated, a shoulder 68 of the latching bar 62 engages against the crossbar 44 of the tongue 42, and continued upward movement of the section 18 results in the latching bar 62 being pivoted to its disengaged position as shown in FIG. 3. The latching bar 62 pivots through an arc, from the engaged position shown in FIG. 2 to the disengaged position shown in FIG. 3, which is limited by the shoulder 70 of the cam surface 66 contacting an upper projection of the base member 53.

Both the upper section 18 and the lower section 20 of the device 17 are designed to permit certain manual adjustments by the operator consistent with conditions under which the device 17 is employed. For example, it may develop that the latching bar 62 will require shifting of its position in a longitudinal direction relative to the tilting frame, particularly when a container loaded for transport is resting on the tilting frame such that the latching bar 62 happens to be in alignment with one of the cross-members 32 instead of the space 30 between adjacent cross-members. The arms 52 and 54 of the base member 53 are spaced at a sufficient distance apart to enable the operator to forcibly move the latching bar a short distance fore or aft on the clevis pin or bolt 56 to properly align it for engaging the container.

The device 17 is also designed to enable its manual disengagement from the disposition shown in FIG. 7. To achieve such disengagement, the operator can simply manually slide the distal ends of the springs 74 off and away from the opposite ends of the crossbar 72 whereby the tongue 42 can be manually pivoted to the right or clockwise as viewed in FIG. 2, thus allowing the latching bar 62 to be releasably pivoted out of its engaged position with the container. Thereafter, manually repositioning the springs 74 as shown in FIG. 4 will restore the device 17 to its automatic operative mode.

Although the device of the invention herein described is intended primarily for use with a truck of the type having a tilting frame to load, unload, and transport large refuse containers, it should be recognized that vehicles other than trucks can be equipped with a tilting frame to transport containers or other large equipment. For example, the device herein described could be adapted to a tilting frame on a railroad car, a barge, or even a large transport aircraft utilizing a tilting frame as a loading means.

Moreover, while the foregoing description basically describes the preferred embodiment of an inventive device, it will be understood by those skilled in the art that modifications embodied in various forms may be made without departing from the spirit and scope of the invention as defined in the appended claims.

What is claimed is:

1. On a truck of the type having a chassis equipped to load, transport, and unload a large refuse container by utilization of a tilting frame extending longitudinally on the chassis and mounted to pivot from a horizontal transport position to a tilted loading position on an axis transverse to and adjacent the rear end of the chassis, and the container having underside spaced-apart parallel rail members for enabling loading and unloading of the container relative to the tilting frame, a device for securing the refuse container, for transport, to the tilting frame, comprising:

a latch assembly including a latch bar, pivotally mounted on and outboard from the tilting frame, for releasably engaging the container;

the latch bar being pivotable between a container-engaging position and a disengaged position; and latch actuation means mounted on the chassis and operatively interacting with the latch bar to cause the latch bar to pivot from its disengaged position to its container-engaging position as a function of the tilting frame being pivoted from its tilted position to a horizontal transport position on the truck chassis.

2. The device of claim 1 wherein the latch bar has an elongated intermediate body portion, a first end being a base portion for mounting the latch bar in its container-engaging position, and a second end having a finger portion integral to and laterally projecting from the intermediate body portion.

3. The device of claim 2 wherein the first end of the latch bar includes integral cam means for operatively interacting with the latch actuation means.

4. The device of claim 2 wherein the latch bar, in its container-engaging position, is disposed with its intermediate body portion vertically oriented.

5. The device of claim 1 wherein the latch bar, in its disengaged position, projects generally outwardly relative to the tilting frame.

6. The device of claim 5 wherein the latch actuation means includes a rigid tongue-like member projecting upwardly beneath the latch bar when the latch bar is in its disengaged position.

7. The device of claim 6 wherein the rigid tongue-like member is mounted to pivot on an axis parallel to the pivot axis of the latch bar.

8. The device of claim 7 further including means normally biasing the rigid tongue-like member to its upwardly-projecting position.

9. The device of claim 8 wherein the biasing means is a torsion spring.

10. The device of claim 8 wherein the biasing means includes at least one helicoidal extension spring.

11. The device of claim 7 wherein the latch actuation means may be selectively manipulated by causing the tongue-like member to pivot away from a container-engaging position to a disengaged position while the tilting frame remains in a horizontal transport position on the truck chassis.

12. On a truck of the type having a chassis equipped to load, transport, and unload a large refuse container by utilization of a tilting frame extending longitudinally on the chassis and mounted to pivot from a horizontal transport position to a tilted loading position on an axis transverse to and adjacent the rear end of the chassis, and the container having underside spaced-apart parallel rail members for enabling loading and unloading of the container relative to the tilting frame, a device for securing the refuse container, for transport, to the tilting frame, comprising:

a latch assembly including a latch bar, pivotally mounted on and outboard from the tilting frame, for releasably engaging the container;

the latch bar being pivotable between a container-engaging position and a disengaged position; and latch actuation means mounted on the chassis and operatively interacting with the latch bar to cause the latch bar to pivot from its container-engaging position to its disengaged position as a function of the tilting frame being pivoted from a transport position on the truck chassis to a tilted position.

13. On a truck of the type having a chassis equipped to load, transport, and unload a large refuse container by utilization of a tilting frame extending longitudinally on the chassis and mounted to pivot from a horizontal transport position to a tilted loading position on an axis transverse to and adjacent the rear end of the chassis, and the container having underside spaced-apart parallel rail members for enabling loading and unloading of the container relative to the tilting frame, a device for securing the refuse container, for transport, to the tilting frame, comprising:

a latch assembly including a latch bar, pivotally mounted on and outboard from the tilting frame, for releasably engaging the container;

the latch bar being pivotable between a container-engaged position and a container-disengaged position; and means for actuating the latch bar to engage the container when the tilting frame has pivoted to the horizontal transport position.

14. The device of claim 13 further comprising means to release the latch bar from the container-engaging position.

15. On a vehicle for loading, transporting, and unloading waste containers, the vehicle having a chassis with a rear end and a longitudinally-extending tilting frame mounted to the rear end of the chassis to pivot about an axis transverse to the longitudinal extension of the frame between a horizontal transport position and a tilted loading position, a device for securing the waste container to the tilting frame during transport, comprising:

a latch assembly including a latch bar pivotally mounted to the tilting frame to pivot about a longitudinal axis;

the latch bar being pivotal from a disengaged position to a container-engaging position as a function of the tilting frame being pivoted from the tilted loading position to the horizontal transport position; and means mounted to the chassis of the vehicle for engaging with the latch bar and causing it to pivot to the container-engaging position as a result of the pivotal movement of the tilting frame from the tilted loading position to the horizontal transport position.

16. On a truck of the type having a chassis equipped to load, transport, and unload a large refuse container by utilization of a tilting frame having spaced-apart siderail members extending longitudinally on the chassis and the tilting frame mounted to pivot from a transport position to a tilted loaded position on an axis transverse to and adjacent the rear end of the chassis, a device for securing the refuse container, for transport, to the tilting frame, comprising:

a latch assembly including a latch bar pivotally mounted on one of the siderail members for releasably engaging the container, the latch bar mounted to pivot on an axis generally parallel to the longitudinal extension of the siderail members, between a container-engaging position and a disengaged position;

latch acutation means mounted to operatively interact with the latch bar to cause the latch bar to pivot from its container-engaging position to its disengaged position; and the latch bar having an elongated body portion and a hook-like tip projecting generally laterally from the body portion to engage the container when the latch bar is in its container-engaging position.

17. On a vehicle for loading, transporting, and unloading waste containers, the vehicle having a chassis with a rear end and a longitudinally-extending tilting frame mounted to the rear end of the chassis to pivot about an axis transverse of the longitudinal extension of the frame between a horizontal transport position and a tilted loading position, a device for securing the waste container to the tilting frame during transport, comprising:

a latch assembly including a latch bar pivotally mounted to the tilting frame to pivot about a longitudinal axis;

the latch bar being pivotal from a disengaged position to a container-engaging position as a function of the tilting frame being pivoted from a tilted loading position to a horizontal transport position; and means for manually releasing the latch bar from its engaged position.

18. The device of claim 17 further including means mounted to the chassis of the vehicle for engaging with the latch bar and causing it to pivot to the container-engaging position as a result of the pivotal movement of the tilting frame from the tilted loading position to the horizontal transport position.

* * * * *